3,681,023
PRODUCTION OF CARBON FIBERS
Yoneho Tabata, Matsudoshi, Chihiro Oizumi, Tokyo, and
 Sugio Otani, Kiryuushi, Japan, assignors to Asahi Kasei
 Kogyo Kabushiki Kaisha
No Drawing. Filed Dec. 15, 1969, Ser. No. 885,350
Claims priority, application Japan, Dec. 20, 1968,
43/93,060
**Int. Cl. C01b *31/07***
U.S. Cl. 23—209.4                                      5 Claims

ABSTRACT OF THE DISCLOSURE

Carbon fiber having a high tensile strength and a high value of Young's modulus is produced by heating, to a substantially carbonized state stretched polyacrylonitrile fiber prepared from polyacrylonitrile which has been produced by the solid state radiation polymerization of acrylonitrile at a temperature not higher than the melting point of acrylonitrile, i.e., −83° C. The carbon fiber so produced can be used as a reinforcement in a composite material.

PRIOR ART

Carbon fibers have been prepared by carbonizing fibers of various organic materials, such as cotton, wool, regenerated cellulose, petroleum pitch, lignin and synthetic polymers such as polyacrylonitrile.

For example, carbon fiber has been made as disclosed in British Pat. 1,110,791 and in Japanese patent publication No. 4,405/1962.

Carbon fiber, which can be made from various organic materials, is used as an reinforcement for a composite material, because of its excellent qualities such as low specific gravity, high tensile strength, a high value of Young's modulus, excellent thermalstability and good chemical resistance. It is well known that carbon fiber made from polyacrylonitrile shows a higher value of Young's modulus than other carbon fibers.

Many attempts have been made to improve the Young's modulus of carbon fiber by modifying heat treatment, for example, as proposed in said British Pat. No. 1,110,791, applying a longitudinal tension to the fiber while heating.

It is noted that conventional processes or attempts to produce carbon fiber by heating the fiber at some stages at an elevated temperature to carbonized state, as disclosed in British patent have been directed to modification in the heat treatment of polyacrylonitrile fiber but as yet no device or invention has been conceived to improve the quality of polyacrylonitrile fiber itself.

THIS INVENTION

This invention is concerned with production of carbon fiber from polyacrylonitrile having higher tensile strength and a high value of Young's modulus from specifically prepared polyacrylonitrile, and more particularly, with production of carbon fiber by heating to a substantially carbonized state stretched polyacrylonitrile fiber spun from polyacrylonitrile which has been prepared by radiating acrylonitrile in the solid state with ionizing radiation at a temperature below the melting point of arcrylonitrile, preferably at a temperature from −89° C. to −196° C.

The process of polymerizing a monomeric compound by irradiating it in the solid state with ionic radiation at a temperature not higher than the melting point of the monomer is referred to hereinafter as radiation induced polymerization.

Preferably, polyacrylonitrile obtained by radiation induced polymerization, is dissolved in nitric acid and then subjected to wet-spinning, whereupon finally being converted, after heat treatment, into carbon fiber of a final diameter not greater than 12 microns having higher tensile strength and a higher value of Young's modulus than those carbon fibers prepared from fibers spun in other spinning process would have had. It is to be noted that these improvements are the results of using polyacrylonitrile as prepared by radiation induced polymerization.

Production of carbon fiber by heating polyacrylonitrile fiber is already well known. On the other hand, radiation induced polymerization of acrylonitrile itself has also been found to be practical.

However, the prior art has not taught nor implied how to use polyacrylonitrile produced by radiation induced polymerization in the production of carbon fiber, with unexpectedly great improvement in the ultimate product quality, particularly, in product tensile strengths as great as 15.0 t.cm.$^2$ and Young's modulus some two times as much as that of conventional carbon fiber.

Application of carbon fiber cover wide fields, where the saving of weight, good flexibility and high tensile strength of the material are needed. For example, polyacrylonitrile carbon fiber can be incorporated into plastics as a reinforcement to form composite material which can be used in the field ranging from specialized civil engineering uses to very light rigid components used in space crafts. Furthermore, carbon fiber composites are used in turbine blades or other components of aircraft engines, special components of airplanes, helicoptor blades, special submarine-hulls, rocket nose cones and rocker launchers, because of their high strength and high value of Young's modulus.

High chemical resistance and thermalstability of carbon fibers enable their advantageous employment in filter materials for high-temperature chemistry, as much. Many additional uses will be readily discerned by those skilled in this art in addition to those set forth above.

DESCRIPTION

One characteristic aspect of the present invention resides in the use of specifical polyacrylonitrile, prepared by the radiation induced polymerization of acrylonitrile in the solid state, as a starting material for carbon fiber hereof.

Another aspect of the present invention resides in that, prior to the heat treatment, thus obtained polyacrylonitrile may be dissolved in nitric acid and then the solution wet spun into fibers.

PREPARATION OF POLYACRYLONITRILE

Acrylonitrile is irradiated with ionizing radiation in the solid state at a temperature not higher than its melting point. The practical temperature range is determined, in consideration of the actual atmospheric pressure melting point (−83° C.) of acrylonitrile and the generation of heat by the polymerization reaction, to be about −89° C. to −196° C. The lower limit of the temperature range set forth has been conveniently determined by economic considerations and operational parameters to coincide to the temperature of liquified nitrogen and is not an operative limitation.

Therefore, although radiation induced polymerization can be effectively conducted at an extremely low temperature as below −196° C., such situation is usually not economically attractive.

The ionizing radiation which can be used in the present invention includes γ-rays, β-rays or electronic rays, each with substantially same radiating effect.

It is preferred to prechoose an appropriate radiation type since the vessel in which irradiation polymerization is carried out and other physical conditions of reaction may vary depending upon the particular radiation source chosen.

It is presumed that the polyacrylonitrile prepared in accordance with the present invention has improved stereospecific structure as compared to the structure of polyacrylonitrile prepared by conventional polymerization of acrylonitrile in the liquid state under moderate conditions. This is considered to have been attained through the radiation induced polymerization in the solid state at such a low temperature, in which the polymerization reaction proceeds within regularly configured crystals of monomer molecules. It is considered that the improved stereospecific structure of polyacrylonitrile is responsible for the improvement in the final tensile strength of carbon fiber of the present invention, as well as the improved Young's modulus and other properties.

PREPARATION OF POLYACRYLONITRILE FIBER

Polyacrylonitrile thus obtained is then converted into fiber by any spinning technique, such as wet spinning using an organic solvent, e.g. dimethylformamide, or an aqueous solution of suitable inorganic salts, or dry spinning. However, wet spinning using nitric acid as a solvent is preferable.

Nitric acid is used advantageously as a solvent since it is more compatible with polyacrylonitrile and can dissolve more polyacrylonitrile than other solvents, giving nitric acid solutions of polyacrylonitrile which have better spinnability.

Prior to carbonization heating, polyacrylonitrile fiber is stretched to such a size as to make the final diameter of the polyacrylonitrile carbon fiber not in excess of 12 microns.

Since it is known that, heating of stretched polyacrylonitrile fiber usually causes considerable shrinkage, the diameter of polyacrylonitrile fiber prior to heating should be greater than 12 microns.

The upper limit of the diameter set forth is determined as a function of the tensile strength and value of Young's modulus which are great enough to provide an excellent reinforcement.

HEAT TREATMENT

Stretched polyacrylonitrile fiber as prepared above is then heated to substantially carbonized state in any conventional manner.

Usually, heating of polyacrylonitrile fiber is carried out in two or three stages, wherein, in the first stage, the fiber is gradually heated from room temperature to 220–230° C. in an oxidizing atmosphere at a rate of 3° C./min. and kept at this temperature for 20–30 hours.

Then in the second stage the temperature is raised to about 500° C. at a rate of 1° C./min. in a non-oxidizing atmosphere, and then finally, in the third stage, the temperature is raised up to 800° C.–2800° C. at a considerable high rate until a substantial part of the fiber is carbonized. Preferably the ultimate temperature ranges from 800° C. to 1600° C.

The upper limit of ultimate temperature may vary within this range, depending on the use to which the carbon fiber is to be put.

Application of longitudinal tension to the fiber during the first stage heating effectively reduces longitudinal shrinkage of fiber during heating.

The first stage and the second stage heating may be combined into one stage and other modifications can be made provided the ultimate temperature does not exceed 2800° C.

When the ultimate temperature exceeds 2800° C., the fiber becomes graphite fiber, which is excluded from the scope of the present invention.

It is preferable not to abruptly raise the temperature since such heating will adversely affect the fine structure of the carbon fiber.

EXAMPLES

In each example, percent is percent by weight, unless otherwise expressedly stated.

EXAMPLE 1

250 cc. of purified acrylonitrile was placed in an appropriate sized glass ampule, which was then sealed to the atmosphere. The ampule was then immersed in liquid nitrogen for approximately 1 hour. Thereafter, the acrylonitrile was irradiated with $\gamma$-radiation from Cobalt 60 at a dose rate of $1 \times 10^6$ $\gamma$/hr. for 2.5 hours, while it was maintained in liquified nitrogen. The content of the ampule was then placed in 1.5 l. of methanol at $-78°$ C., and unreacted acrylonitrile removed. There was obtained polyacrylonitrile as an insoluble product, which was then washed with methanol, dried in vacuo at 45° C. to give light yellowish brown particles in yield of 10 g. (5%).

The specific viscosity (measured as a solution of 0.1% conc. in dimethylformamide at 30° C.) of polyacrylonitrile was 1.6. The infrared spectrum showed exact correspondence to that of standard polyacrylonitrile.

Twenty-two g. of the thus obtained polyacrylonitrile was dissolved in 100 cc. of concentrated nitric acid (conc.=72%) at $-20°$ C. to form a light yellowish brown viscous uniform transparent solution. The viscosity of the solution was 980 poises at 0° C. The solution, while kept at $-5°$ C., was extruded through a spinning nozzle having 26 spinnerets of 0.1 mm$\phi$. at a speed of 3.5 m./min. into a spinning bath having a length of 1.3 m. consisting of saturated aqueous solution of zinc nitrate kept at $-3°$ C. and swollen fibrous material so produced was carried through a wind-up roller rotating at a linear velocity of 2.2 m./min., and then passed through a water-washing bath having a length of 4 m. and maintained at not higher than 10° C. There were finally obtained transparent unstretched fibers swollen with water. Then the fibers were continuously led into a boiling water bath having a length of approximately 1.5 m. at a velocity of 2.2 m./min., wound up at a winding up velocity of 17 m./min., giving stretched fibers 7.8 times as long as their original length.

After drying at 50° C., slightly yellowish brown transparent polyacrylonitrile fibers were obtained. The fibers were 2 denier, with a degree of elongation of 177 of length and a tensile strength of 57 kg./mm.$^2$.

The polyacrylonitrile fibers prepared as above were heated up at a rate of 1° C./min. to 230° C. in an air stream, and maintained at 230° C. for 20 hours, subsequently heated under argon gas which had been cooled to room temperature and then heated to 200 C. at a rate of 5° C./min., to 500° C. at a rate of 1° C./min. and then heated to 1000° C. at a rate of 3° C./min.

The carbonized fibers obtained after the above procedure had the following properties: The yield was 63.8% based on polyacrylonitrile fiber.

Average diameter [1]—10.1 microns
Average tensile strength [1]—15.0 t./cm.$^2$
Average Young's modulus [1]—1130.0 t./cm.$^2$ In a glass ampule there was charged 25 cc. of purified acrylonitrile, to which was further added 5 mole percent of dimethylformamide based on on the acrylonitrile. Then the ampule was sealed in the air, placed in the liquified nitrogen for 1 hour until the contents became solidified. Then the ampule was placed in a bath kept at $-98°$ C. for 2 hours. At $-98°$ C., the contents of the ampule were radiated with $\gamma$-radiation from Cobalt 60 at a dose rate of $1 \times 10^6$ $\gamma$/hour for 2.5 hours. The content was then placed in approximately 1.5 l. of methanol kept at $-78°$ C. to precipitate insoluble polyacrylonitrile product, which was then thoroughly washed with methanol and ---
[1] Average value was taken from the individual values for 19 fibers, with slight deviation from the average value.

dried in vacuo at 40° C. Yield: 140 g. (7%). The specific viscosity of this polyacrylonitrile (measured as a solution of 0.1% conc. in dimethylformamide at 30° C.) was 1.78. The infrared spectrum and the result of elemental analysis of the product showed exact correspondence to that of standard polyacrylonitrile.

Twenty-two g. of the polyacrylonitrile obtained above was dissolved in concentrated nitric acid (conc.=72%) in the same manner as in Example 1, to give a viscous solution having a viscosity of 1090 poise at 0° C.

The solution was spun in the same manner as in Example 1 to give fibers of 3 denier, with a degree of elongation of 20% and a tensile strength of 51 kg./mm.$^2$. The fibers were heated in the same manner as in Example 1, giving carbon fibers having following properties, yield of 62.5%.

Average diameter—10.3 microns
Average tensile strength—14.4 t./cm.$^2$
Average Young's modulus—1210.0 t./cm.$^2$

EXAMPLE 3

Polyacrylonitrile obtained as in Example 1 was dissolved in dimethylformamide to prepare the spinning solution and the solution was spun into water in the same manner as in Example 1, giving finally stretched fibers of 2.1 denier which were 7.8 times as long as their original length. The degree of elongation was 20% of the length and their tensile strength was 44 kg./mm.$^2$.

The polyacrylonitrile fiber thus prepared was carbonized in the same manner as in Example 1, finally giving carbon fibers having following properties, yield of 59.8%.

Average diameter—9.7 microns
Average tensile strength—12.7 t./cm.$^2$
Average Young's modulus—1070 t./cm.$^2$

Comparative test 1

One hundred gram of acrylonitrile was added to 1500 ml. of water, which was adjusted to pH 2.0 by sulfuric acid, in a 2500 ml. three-necked round bottom flask, fitted with a nitrogen inlet tube, a stirrer, and a reflux condenser. The above obtained solution was brought to about 40° C. and maintained at this temperature in a bath. After nitrogen gas was passed through the aqueous solution of acrylonitrile in the flask for about 30 min., 3.3 g. of potassium persulfate and 1.6 g. of sodium pyrosulfate, each of which is dissolved separately in a small amount of an oxygen free water, were added into the flask under continuous agitation. After 4.5 hours, polyacrylonitrile was filtered off and washed with water. 83 g. of polyacrylonitrile were obtained which had a specific viscosity of 1.6 (measured as a 0.1% solution in dimethylformamide at 30° C.).

Spinning and carbonizing conditions were the same as in Example 1. After heating, a carbon fiber was obtained in a yield of 55.2%, which had the following properties:

Average diameter—9.7 microns
Average tensile strength—9.3 t./cm.$^2$
Average Young's modulus—680 t./cm.$^2$

Comparative test 2

The polyacrylonitrile obtained as in Comparative test 1 was spun in the same manner as in Example 3 and heated in the same manner as in Example 1.

After heating, carbon fibers were obtained, in a yield of 52%, which had the following properties:

Average fiber diameter—9.8 microns
Average tensile strength—8.5 t./cm.$^2$
Average Young's modulus—560 t./cm.$^2$

Comparative test 3

Commercial polyacrylonitrile filament "Exlan," which has a diameter of 1.4 denier, a tensile strength of 6.45 g./d. and a degree of elongation of 17.5%, was carbonized under the same condition as in Example 1.

After heating, the carbon fibre was obtained, in a yield of 52.5%, which had the following properties.

Average diameter—10.1 microns
Average tensile strength—8.57 t./cm.$^2$
Average Young's modulus—490 t./cm.$^2$

What we claim:

1. In the production of carbon fibers by carbonizing a stretched spun polyacrylonitrile filament at elevated carbonizing temperatures; the improvement which comprises utilizing a polyacrylonitrile filament spun from acrylonitrile polymerized in the solid state at a temperature up to the melting point of acrylonitrile with ionizing radiation.

2. The process according to claim 1, wherein said acrylonitrile is radiated at a temperature between −89° C. and −196° C.

3. The process according to claim 1, wherein said stretched polyacrylonitrile fiber is prepared by wet spinning a nitric acid solution of polyacrylonitrile into fiber and by stretching the resultant fiber to a size such as to give a carbon fiber, having an ultimate diameter up to 12 microns.

4. The improved process claimed in claim 1 wherein said carbonization is carried out in a multiplicity of heating stages; the first stage heating being at about 3° C. per minute up to about 220 to 230° C.; the second stage heating being at about 1° C. per minute up to about 500° C.; and the third stage heating being up to about 800 to 2800° C.

5. The improved process claimed in claim 4, wherein the first stage heating is under oxidizing conditions and wherein the third stage heating is to about 1600° C.

References Cited

UNITED STATES PATENTS

| | | | |
|---|---|---|---|
| 3,412,062 | 11/1968 | Johnson et al. | 260—37 |
| 3,533,743 | 10/1970 | Prescott et al. | 23—209.1 |
| 3,147,322 | 9/1964 | Fujisaki | 264—182 |
| 3,081,244 | 3/1963 | Campanile | 204—159.22 |

OTHER REFERENCES

Bensasson et al.: "Chemical Abstracts," vol. 59, 1963, col. 8878(d).

Szwarc: "Chemical Abstracts," vol. 66, 1967, 105349m.

EDWARD J. MEROS, Primary Examiner

U.S. Cl. X.R.

23—209.1, 209.2; 204—159.22, 29, 182

UNITED STATES PATENT OFFICE
CERTIFICATE OF CORRECTION

Patent No. 3,681,023           Dated August 1, 1972

Inventor(s) Yoncho Tabata et al

It is certified that error appears in the above-identified patent and that said Letters Patent are hereby corrected as shown below:

Col. 2, line 16

"t.CM.$^2$" should be -- t/CM.$^2$ --.

Col. 4, line 46

"177" should be -- 17% --.

Col. 4, line 61

Insert "EXAMPLE 2" to denote the start of the second example immediately following the table of properties found in Example 1.

Col. 6, line 13 delete "the" following "heating,".

Signed and sealed this 23rd day of January 1973.

(SEAL)
Attest:

EDWARD M. FLETCHER, JR.           ROBERT GOTTSCHALK
Attesting Officer                Commissioner of Patents